Inventors:
Paul Schramm
Josef Blancke

United States Patent Office 3,421,626
Patented Jan. 14, 1969

3,421,626
SEWAGE TREATMENT SYSTEMS INCLUDING AN AERATING RESERVOIR AND A POST-SEDIMENTATION RESERVOIR SUPPLIED FROM SAID AERATING RESERVOIR
Paul Schramm, 80 Hauptstrasse, 6209 Michelbach, Nassau, Germany, and Josef Blanche, 6 Burgschwalberstrasse, 6251 Zollhaus, Germany
Filed Aug. 17, 1966, Ser. No. 573,041
Claims priority, application Germany, Aug. 23, 1965, P 37,519
U.S. Cl. 210—124                     11 Claims
Int. Cl. B01d 21/00

ABSTRACT OF THE DISCLOSURE

Described below is a sewage treatment system adapted to work satisfactorily in instances of excessive overload. The system includes an aerating reservoir, and a post-sedimentation reservoir which is supplied from the former with liquid, i.e. sewage to be processed. In case of overload, such as excessive rainfall, the aerating reservoir is converted into a sedimentation reservoir, i.e. its primary function of aerating the sewage is discontinued. Yet because of the organization of the system, particularly the capacity of the aerating reservoir, it is still possible in instances of excessive overload, or rainfall, to mechanically clean the sewage admitted to the aerating reservoir by sedimentation therein, and to avoid the need of discharging water-diluted sewage without cleaning the latter in any fashion, or to provide large and costly storage facilities for such sewage.

---

This invention relates to sewage treatment systems. It is more particularly concerned with sewage treatment systems which include an aerating reservoir, and a post-sedimentation reservoir supplied with fluid derived from the aerating reservoir.

It is one object of this invention to provide improved sewage treatment systems of this description which are relatively compact, i.e. which require a relatively limited area, and which, on account of these reasons, are relatively inexpensive as far as the cost of their erection are concerned, and are relatively easy to maintain in good working order.

In the kind of sewage treatment systems under consideration the sewage to be processed is initially admitted to the aerating reservoir where it is aerated, or turbulently mixed. The aerated sewage is then transferred to a sedimentation reservoir, or post-sedimentation reservoir. The fluid level in the last mentioned reservoir, is higher than in the aerating reservoir or aerating basin. Generally a bucket, or scoop wheel is provided for transferring the liquid from the aerating reservoir or aerating basin to the sedimentation reservoir, or sedimentation basin. Mud and sludge deposited at the bottom of the latter is recovered by means of the hydrostatic pressure prevailing in the sedimentation reservoir, or sedimentation basin. A portion of this sludge, or mud, may be fed back, or returned, to the aerating reservoir. The post-sedimentation reservoir is drained by a draining channel whose level is higher than that of the aerating reservoir.

At times of heavy rainfall the aerating reservoir, or aerating basin, tends to be overfilled. The liquid in an aerating reservoir, or aerating basin, maintains a predetermined limited range of levels if, and as long as, the supply of fluid does not exceed 4 to 5 times the average fluid supply in dry weather periods. If the fluid supply exceeds the above limit, aerating reservoirs do not operate satisfactorily any longer. It is, therefore, necessary to provide sewage processing systems with additional reservoirs in which quantities of water which exceed the relatively limited permissible capacity of the aerating reservoir are stored, and in which a pre-sedimentation of such quantities of water, or sewage, may be effected. These additional reservoirs must be of considerable size and storage capacity. Their cost of erection and maintenance is high and their presence complicates the operation of such sewage processing systems.

It is, therefore, another object of this invention to provide novel and improved sewage processing systems not subject to the above limitations, or drawbacks, and not requiring large additional rainwater storage facilities.

Further objects and advantages of the invention will become apparent as the following description proceeds, and the features of novelty which characterize the invention will be pointed out with particularity in the claims annexed to, and forming part of, this specification.

For a better understanding of the invention reference may be had to the accompanying drawings in which FIG. 1 is a longitudinal section of a processing system embodying this invention;

Figure 1:
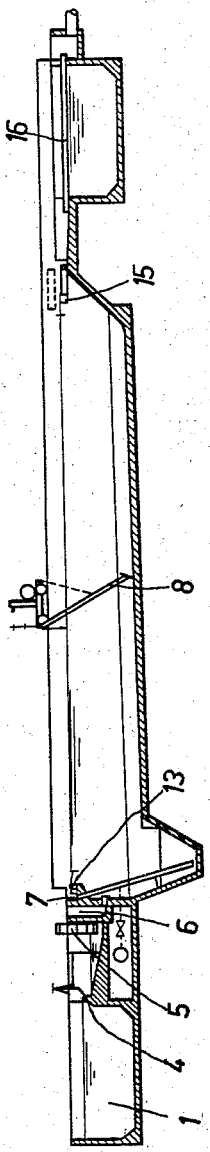

Referring now to the drawings, numeral 1 has been applied to indicate an aerating reservoir, or aerating basin, whose shape is oval or, more generally speaking, is annular. The post-sedimentation reservoir, or post-sedimentation basin, 7 is surrounded by the aerating reservoir 1. This geometry of both reservoirs 1 and 7 is optional, but is the preferred geometry thereof. Reference numerals 2 and 3 have been applied to indicate two aerating drums, or turbulence creating rotors. Each of the two aerating drums, or turbulence creating rotors, is arranged adjacent ends of the oval aerating reservoir 1, as clearly shown in FIG. 2. Each aerating drum, or turbulence creating rotor, extends transversely across aerating reservoir 1, and may be of conventional design, and operated by a conventional motor drive (not shown). Reference numeral 4 has been applied to indicate an overflow whose height is adjustable (see FIG. 1 and FIGS. 4–6). The adjustment of overflow 4 controls the head of fluid in reservoir 1 and consequently the degree, or depth, of submersion of aerating drums, or turbulence creating rotors 2, 3. The water and sludge which flows over and past overflow 4 is raised to a higher level by means of a bucket, or scoop wheel, 5, or equivalent device. The water and sludge raised by bucket, or scoop wheel, 5 is delivered to feed channel 6 (see FIG. 1) which supplies post-sedimentation reservoir 7 with fluid.

The amount of liquid supplied to reservoir 1 depends upon weather conditions. If the weather is relatively dry, an average quantity of liquid is supplied to reservoir 1, which quantity will be referred-to hereafter as the dry weather supply. The maximum liquid-lifting capacity of bucket or scoop wheel 5 should be 3–4 times the dry weather supply. This is a preferred range, and it is permissible to deviate from the same to some extent. The basic rule is that the maximum liquid lifting capacity of bucket or scoop wheel 5 should be a small multiple of the dry weather supply. The difference of the levels in reservoirs 1 and 7 should be in the order of 14 inches.

The sludge deposited at the bottom of the post-sedimentation reservoir 7 may be moved by a sludge mover 8 which is movable in a direction longitudinally of reservoir 7. Sludge mover 8 may be of the blade-type, and is intended to move in a direction longitudinally of reservoir 7 and to move sludge settled at the bottom of reservoir 7 to funnel-shaped structures or sludge funnels 9, 10. The hydrostatic pressure prevailing in sludge funnels 9, 10 causes a rise of the sludge level in two stand pipes 11, 12 whose upper ends communicate with a sludge channel 13. Sludge channel 13 communicates, in turn, with a feed-back pasageway for returning sludge to aerating reservoir 1. The quantity of feed-back of sludge may be controlled by means of a gate valve or slide valve 14.

The liquid contained in post-sedimentation reservoir 7 is discharged over and past an overflow 15 into a draining channel 16. The level of draining channel 16 is higher than the water level in aerating reservoir 1 prevailing under dry weather supply conditions.

The supply passageway 19 to the aerating reservoir 1 may be provided—as usual—with a coarse rake 17, a sand eliminator 18 and a venturi type flow meter 20.

Figure 2:
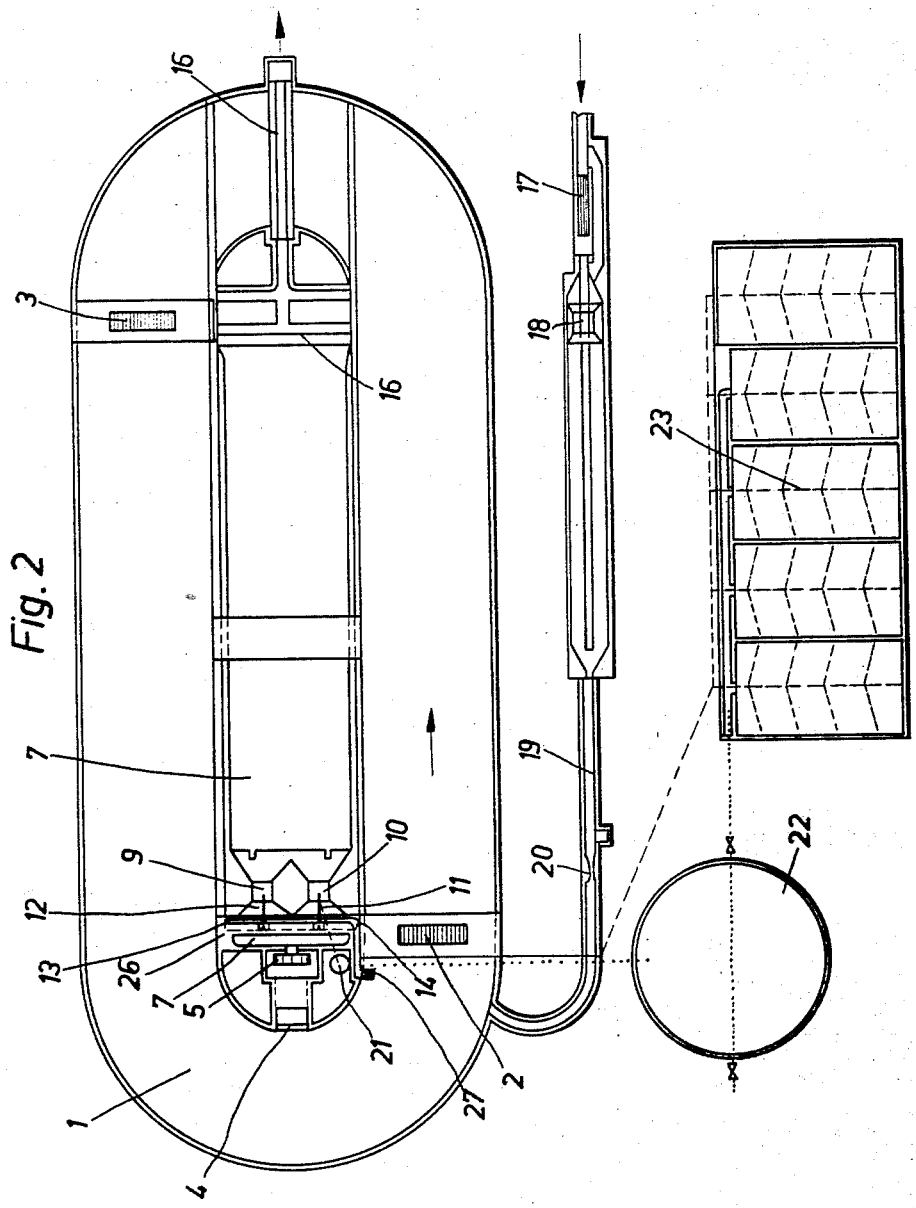
FIG. 2 is a top-plan view of the structure of FIG. 1.
Figure 3:
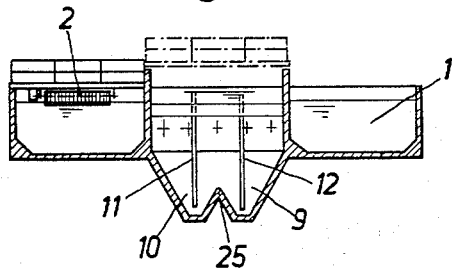
FIG. 3 is a transverse section of the system shown in FIGS. 1 and 2 taken at the point where the mud-collecting funnels thereof are situated.
Figure 4:
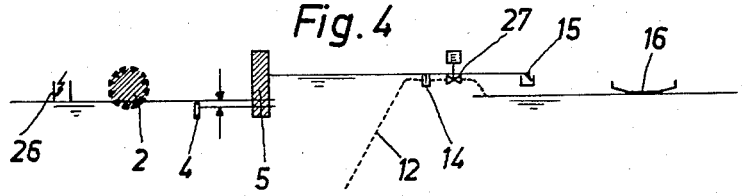
FIGS. 4–6 are diagrammatic representations of the operation of a system embodying this invention under varying conditions of rain water supply.
Figure 5:
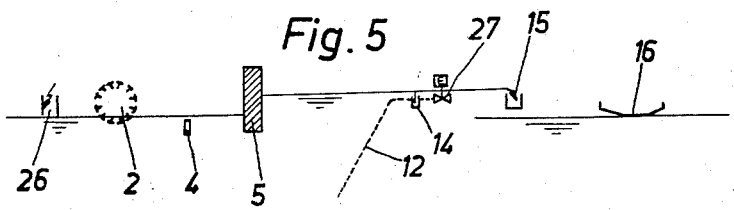
Figure 6:
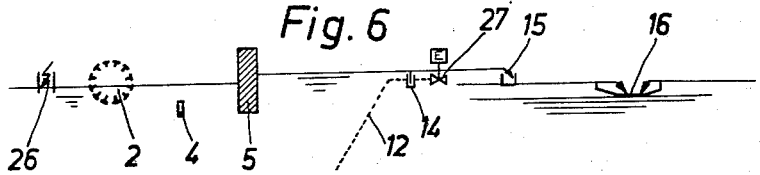

The excess sludge which is not being fed back from sludge channel 13 to aerating reservoir 1 or is restrained by the action of gate valve or slide valve 14 is pumped from standpipe 11 into a sludge-collecting silo 22 by means of an intermittently operating sludge pump 21 (FIG. 2). The sludge collected and stored in silo 22 may be further processed in any conventional way. This sludge may, for instance, be conveyed to sludge drying areas 23. Water drained from sludge drying areas 23 may be fed back to aerating reservoir 1.

Figure 7:
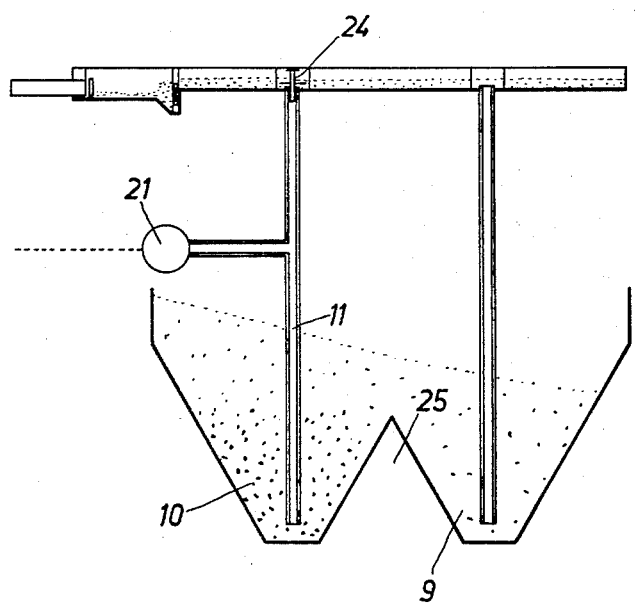
FIG. 7 is in part an elevation, and in part a section, of the sludge-removing means shown in FIG. 3, yet drawn on a considerably larger scale.
Figure 8:
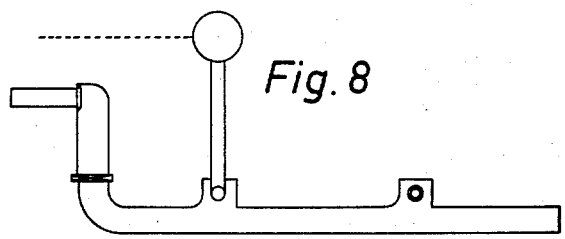
FIG. 8 is a top-plan view of a portion of the structure of FIG. 7.

Standpipe 11 from which sludge is being removed by sludge pump 21 may be closed on its upper end by a pipe 24 superimposed upon standpipe 11 (FIG. 7). Sludge collected in sludge funnel 10 is subject to sedimentation during the intervals of time sludge pump 21 is not operating. Sludge of relatively small density, or consistency, ar relatively watery sludge, flows over partition 25 formed between funnels 9, 10 into sludge funnel 9. Sludge collected in sludge funnel 9 is fed to sludge channel 13 by the intermediary of standpipe 12.

Water admitted through admission passage 19 to reservoir 1 is aerated therein. Concomitant with this aeration process a predetermined head, or level, of liquid is maintained in reservoir 1. Maintaining this predetermined head, or level, of liquid is an important condition for assuring proper, and most effective, operation of aerating drums, or turbulence rotors, 2, 3. Excess liquid is conveyed by means of the bucket, or scoop wheel 5, or an equivalent device, to post-sedimentation reservoir 7. As stated above, sludge deposited in reservoir 7 is, in part, fed back, and in part further processed by conventional sludge processing systems. The average dwelling time of water inside the post-sedimentation reservoir 7 is about one hour, wherepon the water flows over overflow 15 into draining channel 16 (FIGS. 1, 2 and 4-6.)

As long as the admission of liquid through pipe 19 does not exceed 3-4 times, or another small multiple, of the aforementioned dry weather supply, the operation of the system remains substantially unchanged or, in other words, relatively limited amounts of rain have no significant effect on the operation of the system. The level of liquid in aerating reservoir 1 may rise to a small extent, resulting in an increased supply of oxygen. The bucket, or scoop wheel 5 is capable of supplying reservoir 7 with the total quantity of liquid supplied to reservoir 1, and the dwelling time of liquid inside of reservoir 1 remains still in the order of one hour.

The mode of operation of the system changes if, and when, due to a particularly heavy rainfall, the admission of liquid through pipe 19 exceeds 3-4 times, or another small multiple, the aforementioned dry weather supply. This causes a response of the fluid-level-responsive control 26 (see FIGS. 4-6). The fluid-level-responsive control 26 may be of any desired type, e.g. the type involving a float. We have found that in the particular instance the type of fluid-level-responsive control is particularly desirable which involves a pair of spaced electrodes at different potentials which are conductively interconnected when a predetermined level in reservoir 1 is exceeded.

The measurement of the level in reservoir 1 may also be effected indirectly by providing a measuring system measuring the quantity of liquid being admitted to reservoir 1 through admission passage 19. The fluid-level-responsive control 26 responds to an increase of the level in reservoir 1 in the order of about 2 inches, or slightly less.

If the fluid level in reservoir 1 exceeds the above-mentioned critical increase in the order of about 2 inches, the drives (not shown) of aerating drums, or turbulence rotors, 2, 3 are deenergized, and thus the operation of parts 2, 3 automatically interrupted. This is necessary because the proper operation of aerating drums, or turbulence rotors, 2, 3 depends critically upon the level of fluid in aerating reservoir 1.

When the level in reservoir 1 exceeds its maximal permissible magnitude, the fluid-level-responsive control 26 causes closing of a valve, e.g. a gate or slide valve 27, provided in sludge channel 13, precluding feed-back of sludge from reservoir 7 to reservoir 1.

Since not more than about 3-4 times the aforementioned dry weather supply is being pumped from basin 1 into basin 7, the level of the water contained in basin 1 rises substantially, e.g. additional 6 inches. During this period of excessive feeding of reservoir 1 there is no feed-back of sludge, thus tending not to overfill reservoir 1. Since the aerating drums, or turbulence creating rotors, 2, 3 are inoperative during the periods of excessive liquid supply to reservoir 1, reservoir 1 operates as an auxiliary sedimentation reservoir during the periods devices 2, 3 are rendered inoperative, or are at rest.

If the level in reservoir 1 still rises, the level in reservoir 1 may exceed the upper edge of draining channel 16. As a result, there is a direct flow of liquid from reservoir 1 into draining channel 16. The layout of the system may be such that if the supply reaches about 25 times the aforementioned dry weather supply, the average dwelling time, or sedimentation time, of the liquid inside of reservoir 1 is in the order of 30 minutes. The period of time during which liquid inside of reservoir 7 is subject to sedimentation does not depend on the quantity of liquid supplied to reservoir 1, but merely on the pumping capacity of bucket or scoop wheel, 5. Therefore the time available for sedimentation of liquid inside of reservoir 7 will remain in the order of one hour.

After cessation of a period of excessive water supply, as caused by a rainstorm, the level in reservoir 1 drops gradually since the bucket or scoop wheel 5 keeps on transferring a small multiple of the aforementioned dry weather supply from reservoir 1 into reservoir 7. When the water level inside of reservoir 1 has been lowered to such an extent that it is but about 2 inches above dry weather supply conditions, the fluid-level-responsive control 26 re-energizes the drives of aerating drums, or turbulence rotors, 2, 3, thus causing the latter to resume their rotary motions. Simultaneously valve or gate 27 is opened by the action of fluid-level-responsive control 26, allowing feed-back of sludge or mud to reservoir 1.

While the geometry and the relative positions of reservoirs 1, 7 shown in FIG. 2 are a preferred embodiment of our invention, our invention is not limited to a specific geometry and/or position of basins 1 and 7. Reservoirs 1 and 7 may be arranged separate, and in spaced relation. If desired, reservoirs 1, 7 may be formed by parallel channels.

It will be apparent from the foregoing that an aerating reservoir 1 in a system embodying this invention is capable of storing a multiple, e.g. 20 to 30 times of the average dry weather supply, and to subject that amount of fluid to a sedimentation process. The supply of the post-sedimentation reservoir 7, from the aerating reservoir, is a substantially fixed quantity which is a small multiple of the average fluid supply in dry weather periods. The supply of the aerating reservoir 1 with sludge or mud collected in the post-sedimentation tank 7 may be reduced, or entirely interrupted, in periods of heavy rainfall.

As long as the supply of liquid to the aerating reservoir does not exceed 4 to 5 times, or another small multiple, of the dry weather supply thereof, the system operates in the fashion of prior-art systems of the kind under consideration. The bucket or scoop wheel 5 transfers a substantially fixed quantity of fluid from the aerating reservoir, or aerating basin, 1 into the sedimentation basin, or reservoir, 7. Mud deposited in basin, or reservoir, 7 is fed back to reservoir 1 to the extent that such feed-back seems to be necessary, or desirable. The fluid contained in reservoir 7 is being drained into an open channel at a higher level than that of the fluid level in the aerating reservoir or basin 1.

In case that the supply of liquid to the reservoir 1 increases beyond the quantity corresponding 4 to 5 times its dry weather supply, the level in reservoir or basin 1 rises, since the amount of liquid removed from it by bucket, or scoop wheel, 5 is not increased. Now a level will be reached in aerating reservoir, or aerating basin, 1 which is so high that the aerating drums, or turbulence-creating rotors, 2, 3 thereof are no longer in a position to effect a biologically sound cleaning of the fluid in basin 1. Consequently the operation of aerating drums 2, 3 is discontinued, i.e. the drive mechanism thereof is deenergized, and the rotation of drums 2, 3 interrupted. At the same time the feedback of mud collected in sedimentation tank, or basin, 7 into aerating reservoir, or aerating basin, 1 is interrupted. The level of the fluid in aerating reservoir, or aerating basin, 1 then rises to such an extent that it reaches the level of the upper edge of the draining channel 16 of the reservoir, or basin, 7. Consequently aerating reservoir, or aerating basin, 1 may now be drained directly through draining channel 16. At this stage the aerating reservoir 1 does not perform any longer as an aerating reservoir, but as a storage reservoir capable of cleaning its supply of fluid by sedimentation therein and capable of storing a large quantity of liquid, this quantity depending, inter alia, upon the level of the draining channel 16.

As is apparent from the foregoing, the change from dry weather supply operation of the system to its operation under excessive fluid supply conditions may be effected automatically. This involves an automatic de-energization of the drives of aerating drums or turbulence creating drums 2, 3, and of an automatic interruption of the feed-back of mud from reservoir 7 to reservoir 1.

If the supply of fluid to reservoir 1 decreases, its level will decrease. At a predetermined level the drives for aerating drums will be automatically re-energized, and drums 2, 3 will begin to rotate again, thus re-initiating the aerating function of aerating reservoir 1. Simultaneously the feed-back of mud from reservoir 7 to reservoir 1 is resumed. The level of the draining channel 16 is preferably so high that reservoir 1 is in a position to store about 25 times its dry weather storage capacity, and to store it for an average period of 30 minutes (dwelling time), before the fluid is discharged into draining channel 16. This period of time results in a fairly effective sedimentation within reservoir 1 which is then followed by a second sedimentation stage in reservoir 7.

It will be understood that we have illustrated and described herein a preferred embodiment of our invention, and that various alterations may be made in the details thereof without departing from the spirit and scope of the invention as defined by the appended claims.

We claim as our invention:

1. A sewage treatement system having an aerating reservoir and a post-sedimentation reservoir, said system including:

(a) an aerating reservoir having movable aerating means and being supplied with a predetermined average supply of liquid in periods of relatively dry weather, and having a storage capacity being a large multiple of said average supply of liquid, the level of liquid in said aerating reservoir being relatively low as long as supplied with said average supply of liquid and reaching a predetermined maximum level in periods of excessive rainfall;

(b) a post-sedimentation reservoir supplied with liquid from said aerating reservoir;

(c) means for lifting liquid from said aerating reservoir to a higher level in said post-sedimentation reservoir, said lifting means having a liquid lifting capacity being a small multiple of said average liquid supply to said aerating reservoir;

(d) means for returning sludge collected in said post-sedimentation reservoir to said aerating reservoir;

(e) means for inhibiting operation of said sludge returning means; and (f) a draining channel arranged to drain said aerating reservoir in cases when the level therein exceeds said predetermined maximum level.

2. A sewage treatment system as specified in claim 1 including a scoop wheel for lifting fluid from said aerating reservoir to said post-sedimentation reservoir, said scoop wheel having a fluid-lifting capacity of 4 to 5 times the average fluid supply to said aerating reservoir in periods of relatively dry weather.

3. A sewage treatment system as specified in claim 1 wherein said aerating reservoir is provided with rotatable aerating means and wherein the liquid level in said aerating reservoir is metered by a liquid-level-responsive control controlling the operation of said rotatable aerating means and controlling the operation of the said means for inhibiting operation of said sludge returning means so that upon exceeding of a predetermined level of liquid in said aerating reservoir said rotatable aerating means are stopped and rendered inoperative and the return of sludge from said post-sedimentation reservoir to said aerating reservoir inhibited and so that upon a predetermined drop of the level of liquid in said aerating reservoir said rotatable aerating means are again rotated and rendered operative and the return of sludge to said aerating reservoir resumed.

4. A sewage treatment system as specified in claim 3 wherein said liquid-level-responsive control includes a pair of spaced electrodes forming a gap adapted to be closed by the rise of the level of the liquid in said aerating reservoir.

5. A sewage treatment system as specified in claim 1 wherein the upper edge of the draining channel is arranged above the upper edge of the aerating reservoir to such an extent that the aerating reservoir is caused to store about 25 times the average supply thereof in periods of relatively dry weather before the level of liquid therein equals the level of the upper edge of the draining channel.

6. A sewage treatment system as specified in claim 5 wherein the aerating reservoir has the capacity to store about 25 times the average dry weather supply thereof and allows liquid to dwell therein for about 30 minutes prior to the discharge thereof.

7. A sewage treatment system as specified in claim 1 wherein said aerating reservoir surrounds said post-sedimentation reservoir substantially in the form of an endless loop.

8. A sewage treatment system having an aerating reservoir and a post-sedimentation reservoir, said system including:

(a) an aerating reservoir including movable aerating means and being supplied with a predetermined average supply of liquid in periods of relatively dry weather and having a storage capacity being a large multiple of said average supply of liquid;

(b) a post-sedimentation reservoir supplied with liquid from said aerating reservoir;

(c) means for lifting liquid from said aerating reservoir to a higher level in said post-sedimentation reservoir, said liquid lifting means having a liquid lifting capacity being a small multiple of said average liquid supply to said aerating reservoir;

(d) means for sensing the level of fluid in said aerating reservoir;

(e) means under the control of said fluid-level-sensing means for normally returning sludge collected in said post-sedimentation reservoir to said aerating reservoir, said means being inhibited by said fluid-level-sensing means from returning sludge from said post-sedimentation reservoir to said aerating reservoir when a predetermined fluid level is reached in said aerating reservoir;

(f) means under the control of said fluid-level-sensing means for normally maintaining said movable aerating means in an operative state and for inhibiting operation of said movable aerating means upon reaching of a predetermined fluid level in said aerating reservoir;

(g) a draining channel for draining said post-sedimentation reservoir; and (h) an overflow for draining said aerating reservoir into said draining channel when a maximum fluid level is being reached in said aerating reservoir.

9. A sewage treatment system as specified in claim 8 wherein the storage capacity of said aerating reservoir is in the order of 20 to 30 times said average supply of liquid, and wherein the level of said overflow is arranged to allow draining of said aerating reservoir into said draining channel when said storage capacity of said aerating reservoir is about to be exceeded.

10. A sewage treatment system as specified in claim 8 wherein said means for sensing the level of fluid in said aerating reservoir include a pair of spaced electrodes arranged in an electric circuit and conductively interconnected when a predetermined fluid level is being reached in said aerating reservoir.

11. A sewage treatment system as specified in claim 8 wherein said means for sensing the level of fluid in said aerating reservoir include means for measuring the quantity of liquid being admitted to said aerating reservoir.

References Cited

UNITED STATES PATENTS

| 2,072,206 | 3/1937 | Hetzer | 210—109 |
|---|---|---|---|
| 2,089,160 | 8/1937 | Darby | 210—527 X |
| 2,431,640 | 11/1947 | Gordon | 210—111 X |
| 2,798,042 | 7/1957 | Cox | 210—195 X |
| 2,994,432 | 8/1961 | Schluter | 210—109 X |
| 3,121,680 | 2/1964 | Ciabattari | 210—109 X |
| 3,295,682 | 1/1967 | Schramm | 210—219 |

FOREIGN PATENTS

| 1,324,936 | 3/1963 | France. |
|---|---|---|
| 1,025,771 | 4/1966 | Great Britain. |

REUBEN FRIEDMAN, *Primary Examiner.*

J. L. DE CESARE, *Assistant Examiner.*

U.S. Cl. X.R.

210—195, 219, 256, 527